United States Patent
Zhu (10) Patent No.: US 8,428,068 B2
(45) Date of Patent: Apr. 23, 2013

(54) METHOD, APPARATUS AND SYSTEM FOR MANAGING ROUTES

(75) Inventor: Ning Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 377 days.

(21) Appl. No.: 12/896,624

(22) Filed: Oct. 1, 2010

(65) Prior Publication Data

US 2011/0019683 A1   Jan. 27, 2011

Related U.S. Application Data

(63) Continuation of application No. PCT/CN2009/070749, filed on Mar. 11, 2009.

(30) Foreign Application Priority Data

Apr. 2, 2008  (CN) .......................... 2008 1 0090833

(51) Int. Cl.
  *H04L 12/56*  (2006.01)

(52) U.S. Cl.
  USPC .................................................. 370/395.31

(58) Field of Classification Search ............. 370/395.31, 370/389, 392; 709/227–229
  See application file for complete search history.

(56) References Cited

U.S. PATENT DOCUMENTS 6,944,166 B1 * 9/2005 Perinpanathan et al. ..... 370/401
2005/0073998 A1   4/2005 Zhu et al.

FOREIGN PATENT DOCUMENTS

| CN | 1756214 A | 4/2006 |
|---|---|---|
| CN | 101026579 A | 8/2007 |
| WO | WO2007025447 A1 | 3/2007 |

OTHER PUBLICATIONS

Alcatel-Lucent, Proposed new Draft ITU-T Rec. H.248.IPR—IP Router Package, Jan. 17-23, 2008, Telecommunication Standardization Sector, AVD-3277, entire document.*
F. Cuervo et al., Megaco Protocol Version 1.0, Nov. 2000, Network Working Group, RFC 3015, entire document.*
Office Action issued in corresponding European Patent Application No. 09737390.8, mailed Apr. 12, 2012.
Written Opinion of the International Searching Authority issued in corresponding PCT Patent Application No. PCT/CN2009/070749, mailed Jun. 18, 2009.
International Search Report issued in corresponding PCT Application No. PCT/CN2009/070749; mailed Jun. 18, 2009.
Office Action issued in corresponding Chinese Patent Application No. 200810090833.6, mailed Aug. 2, 2010.
"Gateway Control Protocol: IP Router Package", Rapporteur Meeting Document, Telecommunication Standardization Sector, New Draft ITU-T Rec. H248.IPR. Seoul (Korea), Jan. 17-23, 2008.
Office Action issued in Chinese Patent Application No. 200810090833.6, mailed Feb. 14, 2011.

(Continued)

*Primary Examiner* — Andrew Chriss
*Assistant Examiner* — Jose Perez
(74) *Attorney, Agent, or Firm* — Brinks Hofer Gilson & Lione (57) ABSTRACT

The present invention discloses a method, an apparatus, and a system for managing routes, enables the MG to implement routing functions in the network communications field, and facilitates the operations on the routing table in the MG. A route context stores route records, and the MG searches for a route by searching for the corresponding route context only, thus facilitating the route management. The embodiments of the present invention are primarily applied to the MG and the MGC, especially to the MG that implements the routing functions.

13 Claims, 7 Drawing Sheets

OTHER PUBLICATIONS

Extended European Search Report issued in corresponding European Patent Application No. 09727390.8, mailed Feb. 28, 2011.
Cuervo et al., "Megaco Protocol Version 1.0", Network Working Group. Standards Track, Nov. 2000.

Alcatel-Lucent, "Proposed New Draft ITU-T Rec. H.248.IPR—IP Router Package", Telecommunication Standardization Sector, Study Group 16, AVD-3277. Seoul, Korea, Jan. 17-23, 2008.

* cited by examiner

METHOD, APPARATUS AND SYSTEM FOR MANAGING ROUTES

CROSS-REFERENCE TO RELATED APPLICATIONS

This application is a continuation of International Application No. PCT/CN2009/070749, filed on Mar. 11, 2009, which claims priority to Chinese Patent Application No. 200810090833.6, filed on Apr. 2, 2008, both of which are hereby incorporated by reference in their entireties

FIELD OF THE INVENTION

The present invention relates to the network communications field, and in particular, to a method for managing routes in a Media Gateway (MG) after the MG implements the routing function, and to an apparatus and a system for applying the route management method.

BACKGROUND OF THE INVENTION

Figure 1:
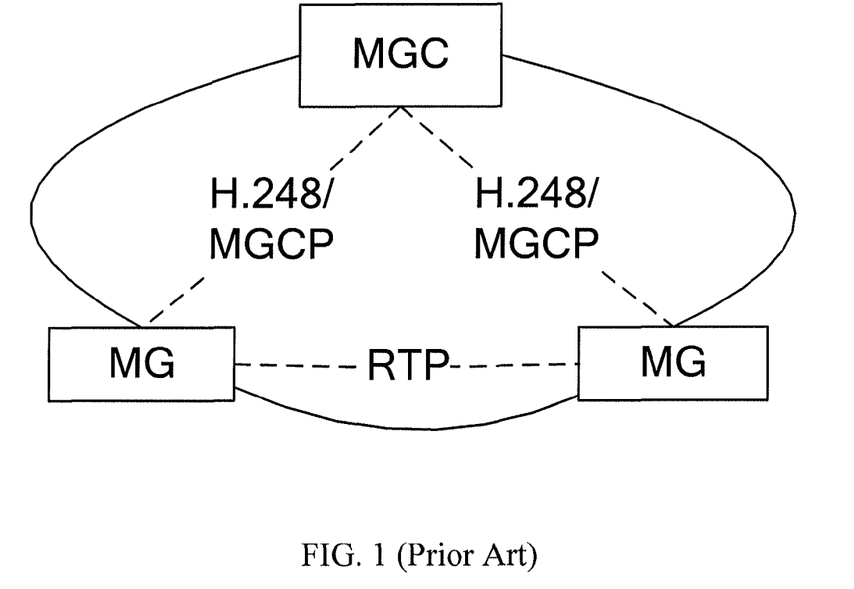
FIG. 1 is a networking diagram of an MG and an MGC in the prior art.

As shown in FIG. 1, a Next Generation Network (NGN) includes an MG and a Media Gateway Controller (MGC). The MGC is designed to manage call states and control bearer resources of the MG. The MG is designed to: convert the format of media streams, for example, converts a Pulse Code Modulation (PCM) timeslot in a Circuit-Switched (CS) network into a Real-time Transport Protocol (RTP) media stream in an Internet Protocol (IP) network; create, modify, and release media streams, and manage resources under signaling control of the MGC.

The MG may be used as a border gateway between networks of different IP segments to transmit media streams between such networks. When the MG serves as a border gateway, the MG generally works in Back-to-Back (B2B) mode. That is, IP terminations are created in two networks of two different IP segments separately, and media stream channels are created between the two IP networks through the IP termination. Inside the MG, the two IP terminations are placed in the same context, thus creating a complete media stream transmission channel and enabling transmission of media streams between two networks of different IP segments. In B2B mode, when the media stream passes through the MG, the MG needs to modify the source address and the destination address of the media stream in order to transmit the media stream to the destination network.

When the MG serves as a border gateway between different IP networks, the MG may work in an IP Router (IPR) mode. That is, the MG implements the routing function, and the source address and the destination address do not need to be modified when the media stream passes through the MG. The MG searches a routing table maintained in the MG to obtain the egress interface corresponding to the destination address and the next-hop address.

Currently, when the MGC manages and controls the MG, events are exchanged between the MGC and the MG through H.248, and the routing table is stored in the MG through an H.248 property expressed as a sub-list of string. A routing table is composed of route records (namely, routes). When a routing table includes a large number of route records, for example, 100,000 records, each operation for the H.248 property is equivalent to operation for the entire routing table because the routing table is stored through an H.248 property. Consequently, it is not convenient to operate a specified route record accurately, and therefore operations on routes are rather inconvenient.

SUMMARY OF THE INVENTION

The embodiments of the present invention provide a method, an apparatus, and a system for managing routes to invoke or operate routes or a routing table conveniently.

To achieve such objectives, the embodiments of the present invention are based on the following technical solution:

A route managing method includes:
  by an MG, creating a route context that stores at least one route record; and
  managing the route record by operating the route context.

A route management apparatus includes:
  a creating module, configured to create a route context that stores at least one route record in an MG A route management system includes:
  an MGC, configured to control an MG to create a route context; and an MG, configured to create the route context under control of the MGC, where the route context stores at least one route record.

In the embodiments of the present invention, a route context stores route records. At the time of performing management operations on a route, only the context corresponding to the route needs to be operated. In this way, every route can be operated separately, thus facilitating operation and management on route records.

DETAILED DESCRIPTION OF THE EMBODIMENTS

Two new concepts are introduced: Interface IPR Context ("interface context" for short), and Route IPR Context ("route context" for short).

The interface context describes the connection between interfaces on the MG, and a termination in the interface context represents an interface. The IP packet received on an interface/termination leaves the MG through another interface/termination in the interface context. By filtering, monitoring and collecting statistics on the terminations in the interface context, the interface-level filtering, monitoring and statistics collecting can be implemented. The interfaces on an MG are grouped into one or more groups. The interfaces in each group are placed in the same interface context; and no forwarding of IP packets occurs between an interface of a group and an interface of a different group.

The route context is designed to manage the routing table. A route context includes two terminations, representing an ingress termination and an egress termination. A route context describes a route record in the routing table. The route record is described through a context property or a property on a termination in the context. Therefore, when a new route context is created, a new route record is added in the routing table. If all terminations in the route context are deleted, the route context is deleted and the route record described by the route context is deleted from the routing table. An alternative solution is provided herein: The data type of the context property or the property on the termination is defined as a list, and one route context describes multiple route records.

A route context represents an abstract route record, and an IP stream flows through the MG through the termination in the interface context. The route context is primarily designed to store route records. Two terminations in the route context are also abstract concepts. It is possible that only one termination is created in a route context, and filtering, events or statistics set for the IP stream which uses the stored route record may be set to this termination.

In this embodiment, a route context is created to store routes; operations on the route are performed by operating the corresponding route context without always accessing the entire routing table.

A correlation may be created between the interface context and the route context. In this way, a route context can be searched out more quickly according to the correlation. An optional mode is: A context property in the route context carries a context identifier (ID), through which a correlation is created between the route context and the interface context.

In this embodiment, a type property (Route Type) of the context represents the route context and the interface context. This type property is an enumeration variable, and its value is IIPR, RIPR, or B2B.

The value "IIPR" indicates that the context is an interface IPR context, or also known as interface context. The value "RIPR" indicates that the context is a route IPR context, or also known as route context. The value "B2B" indicates that the context is an ordinary B2B context.

The route context is designed to maintain a route, and generally includes two interfaces (T1 and T2), which are the ingress interface and the egress interface of the IP packet of the route respectively. Because a route has a definite egress interface but has no specified ingress interface, T2 may refer to a specific egress interface, but T1 represents any possible ingress interface of the route. In order to make a route context identify a route, the route context needs to have a new context property "route record" for storing route records. The data type of the route record is a string. The string stores a route record which includes basic information such as destination network address, mask, next-hop address, and egress interface ID. The route record may include additional information such as cost (overhead). The format of the string is:

"network destination"|"netmask"|"Next Hop ID"|"Interface ID"|"cost". For example: "10.85.28.0|255.255.254.0|10.85.29.160|interface1|1", where: 10.85.28.0 is a destination network address, 255.255.254.0 is a mask, 10.85.29.160 is a next-hop address, and "interface1" is the name of the egress interface, and 1 is the overhead.

A route record may also be described through a property on the termination in the route context; or a string list format is defined through the property on the termination in the route context to describe one or more route records; or the context property of the route context is defined as a string list format for describing one or more route records.

An interface context includes interfaces covered in the same group, and packets can be routed and forwarded between such interfaces. Through a correlation property in the route context, a route can be searched out by searching for the route context corresponding to the correlation property of the interface context and searching for the route record in the route context. In this way, the search scope of the route context is narrower, and the route search is faster.

An ordinary context processes an IP packet by forwarding the IP packet in B2B mode based on the prior art, namely, the source address and the destination address needs to be modified.

After the IP packet arrives at the interface of the MG, the MG judges whether the IP packet needs to be transmitted through an ordinary context or an interface context plus a route context according to the destination address of the IP packet. Specifically, if the destination address of the IP packet is the same as the address of the interface that receives the IP packet, the IP packet needs to be processed through an ordinary context; otherwise, the IP packet needs to be processed through an interface context and a route context.

The embodiments of the route management method and apparatus of the MG are elaborated below with reference to the accompanying drawings.

Embodiment 1

Figure 2:
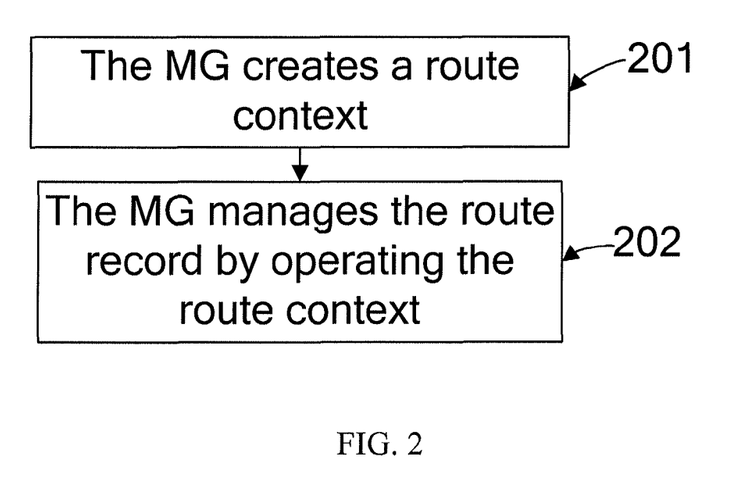
FIG. 2 is a flowchart of a route management method of an MG in Embodiment 1 of the present invention.

As shown in FIG. 2, the route management method in this embodiment includes the following steps:

201. The MG creates a route context.

The MGC instructs the MG to create a route context, namely, creates a context whose type property value is "RIPR". The route context stores one route record. That is, the route record is set in the Route Record property. The format of the route record is: network destination"|"trnetmask"|"Next Hop ID"|"Interface ID"|"cost.

202. The MG manages the route record by operating the route context.

The MG operates the route context corresponding to the route record to manage the route record when necessary.

Figure 3:
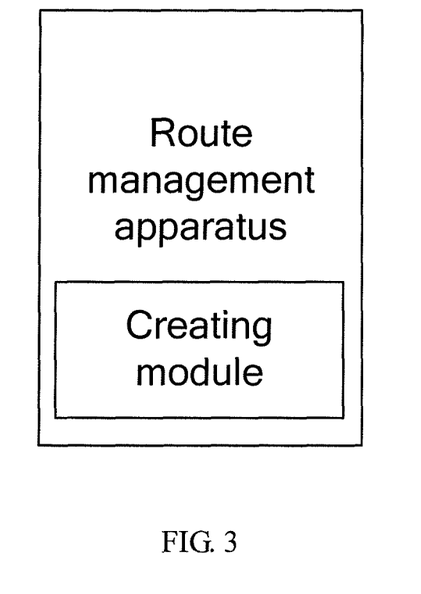
FIG. 3 is a block diagram of a route management apparatus of an MG in Embodiment 1 of the present invention.

Corresponding to the foregoing MG route management method, an MG route management apparatus is provided in this embodiment. As shown in FIG. 3, the apparatus includes a creating module. The creating module creates a route context in the MG, namely, creates a context whose type property value is "RIPR", and then a Route Record property is added in the route context. The Route Record property stores a route record.

A route management system is provided in this embodiment. The route management system includes an MG and an MGC. The MGC controls the MG to create a route context, namely, create a context whose property value is "RIPR". The Route Record property of this route context stores at least one route record.

In this embodiment, route records are stored through a route context. When the MG needs to perform a management operation for a route, the MG may search out the route in the route context that stores the route record. In this way, every route in the masses of route records can be operated separately, and therefore the route record can be operated and managed conveniently.

The MGC can set the route record on the MG according to the method provided in this embodiment. The MGC can also modify the Route Record property or delete a route context.

Embodiment 2

Figure 4:
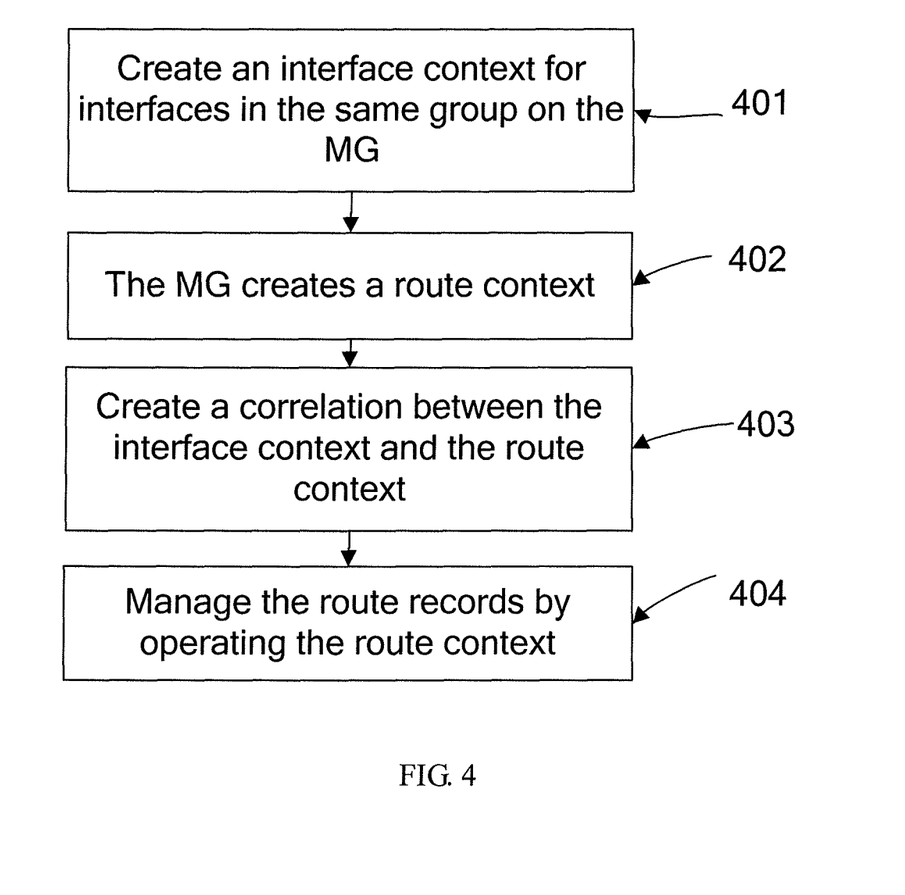
FIG. 4 is a flowchart of a route management method of an MG in Embodiment 2 of the present invention.

This embodiment makes improvement on the basis of Embodiment 1. As shown in FIG. 4, the MG route management method in this embodiment includes the following steps:

401. Create an interface context for interfaces in the same group on the MG.

The MGC controls the MG to create an interface context for the interfaces in the same group on the MG, namely, create a context whose type property value is "IIPR". Generally, the interfaces of the MG are grouped into at least one group. IP packets can be forwarded between the interfaces in each group, but cannot be forwarded between an interface in a group and an interface in a different group. In order to discriminate interfaces in different groups, the MG creates an interface context for the interfaces in the same group on the MG, namely, creates a context whose type property value is "IIPR".

The interface context includes topological relationships between interfaces in the group. It is assumed that a group includes three interfaces: T1, T2 and T3. The topological relationships are described as follows:

T1T2 oneway: Data can be forwarded from T1 to T2, but data cannot be forwarded from T2 to T1, namely, a unidirectional channel exists between T1 and T2;

T1 T3 bothway: Data can be exchanged between T1 and T3; and

T2 T3 bothway: Data can be exchanged between T2 and T3.

Topological control is exercised in the MG properly through the foregoing topological relationships.

402. Create a route context in the MG.

When the MG generates a dynamic route through a Dynamic Routing Protocol (DRP) or generates a static route through configuration, a route record needs to be added, and a route context whose type property value is "RIPR" needs to be created in the MG. The newly added route record is stored in the route context.

One route context stores one route record. That is, the route record is stored in the Route Record property. The format of the stored route record is: "network destination"|"netmask"|"Next op ID"|"Interface ID"|"cost".

403. Create a correlation between the interface context and the route context.

A value is assigned to the correlation property in the route context, and the correlation property may be defined as integer data. In this embodiment, the value assigned to the correlation property may be the context ID of the relevant interface context. A route can be searched out according to the value of the correlation property, namely, the relevant route context is searched out according to the context ID of the interface context. In this way, the search scope is narrower, and therefore the search process is faster.

404. Manage the route records by operating the route context.

The MG manages a route record (for example, modifies or deletes the route record) by operating the corresponding route context. In the route management method described above, a route context is used to manage routes. The route context stores route records. At the time of operating a route record, it is not necessary to invoke all route contexts, but it is necessary to invoke the route context related to this route record only, thus facilitating the operation. A correlation property is defined in the interface context and the route context. A route can be searched out by searching for the relevant route context according to the context ID of the interface context. In this way, the search scope is narrower, and the search process is faster.

Figure 5:
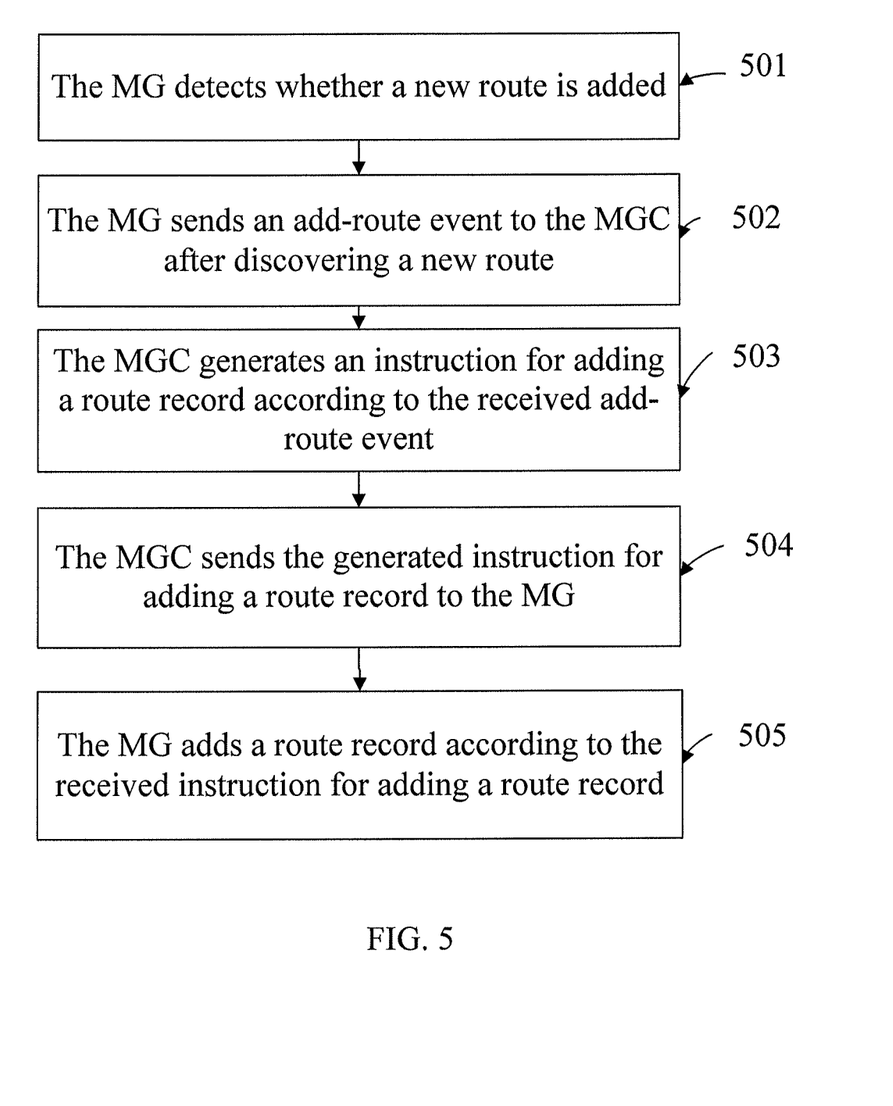
FIG. 5 is a flowchart of adding a route in the route management method of an MG in Embodiment 2 of the present invention.

The DRP on the MG may refresh the routes anytime, and the MG may refresh the static routes due to change of the statistic route configuration. Therefore, the routes in the MG need to be operated (for example, added, deleted, or modified) when necessary. As shown in FIG. 5, the process of adding a route based on the MG route management method in this embodiment includes the following steps:

501. The MG detects whether a new route is added.

The MG may use a DRP to discover the new route and obtain the information about the new route. The information about a new route includes: destination network address of the new route, mask, next-hop address, and egress interface number.

502. The MG sends an add-route event to the MGC after discovering a new route.

After discovering a new route, the MG sends an event about the new route to the MGC. A parameter of the event carries the new route record (the format of the route record is the same as the Route Record property defined above), namely, route information such as destination network address, mask, next-hop address, and egress interface number obtained in step 501.

To enable the MG to send the event to the MGC, a New Route Record (NRR) event is added for reporting the new route. The NRR event is detected on the termination of the interface context. The parameter "entries" of this event carries the new route record. This parameter may carry one or more route records. For the format of this parameter, see the Route Record property defined above.

503. The MGC generates an instruction for adding a route record according to the received add-route event.

According to the add-route event and the route record in the event, the MGC generates an instruction for adding a route record (which is generally an H.248 message). Because a new route record may be stored in the existing route context (if one route context can store multiple route records), or stored in a newly added route context, the instruction for adding a route record varies and depends on the feature of the new route record. For example, the instruction may be an instruction for adding a route context, or an instruction for adding a route record in the route context.

504. The MGC sends the generated instruction for adding a route record to the MG.

505. The MG adds a route record according to the received instruction for adding a route record, as detailed below:

If the MG receives an instruction for adding a route record in the route context, because the defined format of the Route Record property is a sub-list of string, the MG adds a string into the sub-list of string of the Route Record property in a specified route context. The string is the new route record.

If the MG receives an instruction for adding a route context, the MG creates a route context, and stores the Route Record property of the created route context as the new route record.

Figure 6:
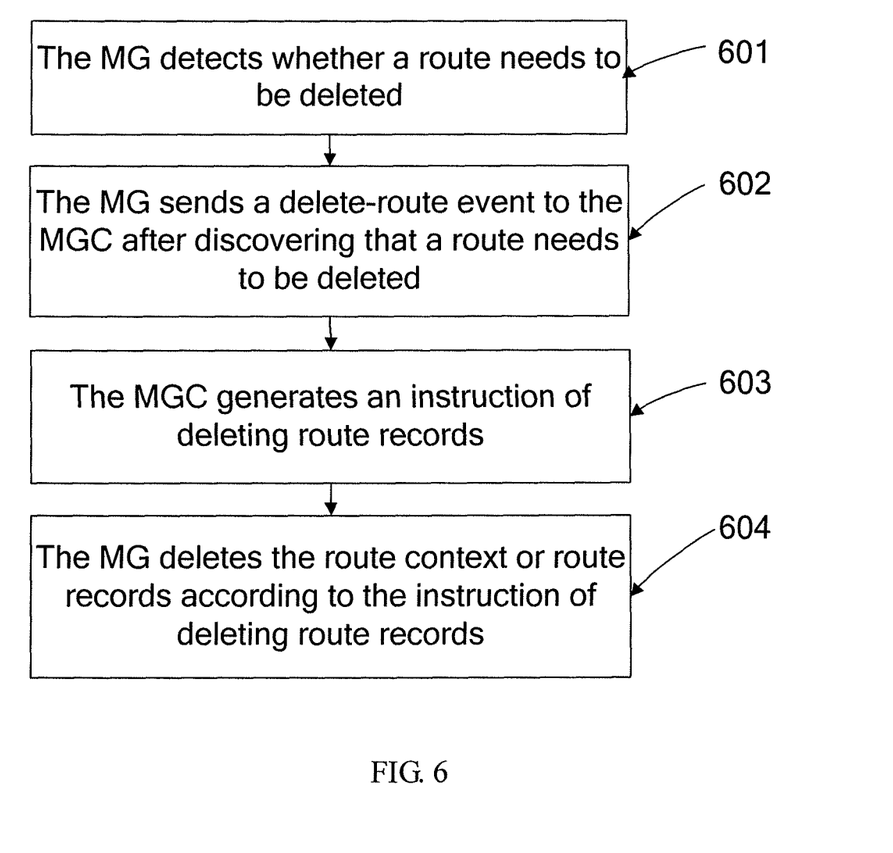
FIG. 6 is a flowchart of deleting a route in the route management method of an MG in Embodiment 2 of the present invention.

As shown in FIG. 6, the process of deleting a route based on the MG route management method in this embodiment includes the following steps:

601. The MG detects whether a route needs to be deleted.

For example, through the DRP, the MG discovers that a route needs to be deleted, or a route record is deleted through static configuration of a network management system on the MG 602. The MG sends a delete-route event to the MGC after discovering that a route needs to be deleted.

If all route records in a route context need to be deleted, the event includes the route context ID to be deleted. If the applied solution allows a route context to store more than one route record, and a specific route context includes two or more route records but only a part of the route records needs to be deleted, the event needs to further include the route records that need to be deleted. A newly added event property bears the information carried in this event.

To enable the MG to send the event to the MGC in this step, a Delete Route Record (DRR) event is added for reporting the deletion of the route record. The DRR event is detected on the termination of the interface context. A parameter "context ID" is defined for the DRR event to carry the route context ID. This event may carry one or more route context IDs. A parameter "entries" is defined for the DRR event to carry the deleted route record. This parameter may carry one or more route records that need to be deleted. Before the route record is deleted, the route record is stored in the Route Record property of the route context. If a route context stores no route record, it is recommended to delete this route context by deleting all terminations in it.

603. The MGC generates an instruction for deleting route records.

After receiving the delete-route event, the MGC needs to generate an instruction for deleting route records according to the information carried in the event, and send the instruction to the MG.

604. The MG deletes the route context or route records according to the instruction for deleting route records.

After receiving the instruction for deleting route records, the MG searches out the route context according to the information carried in the instruction and deletes the route context, or deletes the route records that need to be deleted from the context.

When the route changes, the MG may add a route or delete a route according to the methods illustrated in FIG. 5 and FIG. 6 to modify the route.

Figure 7:
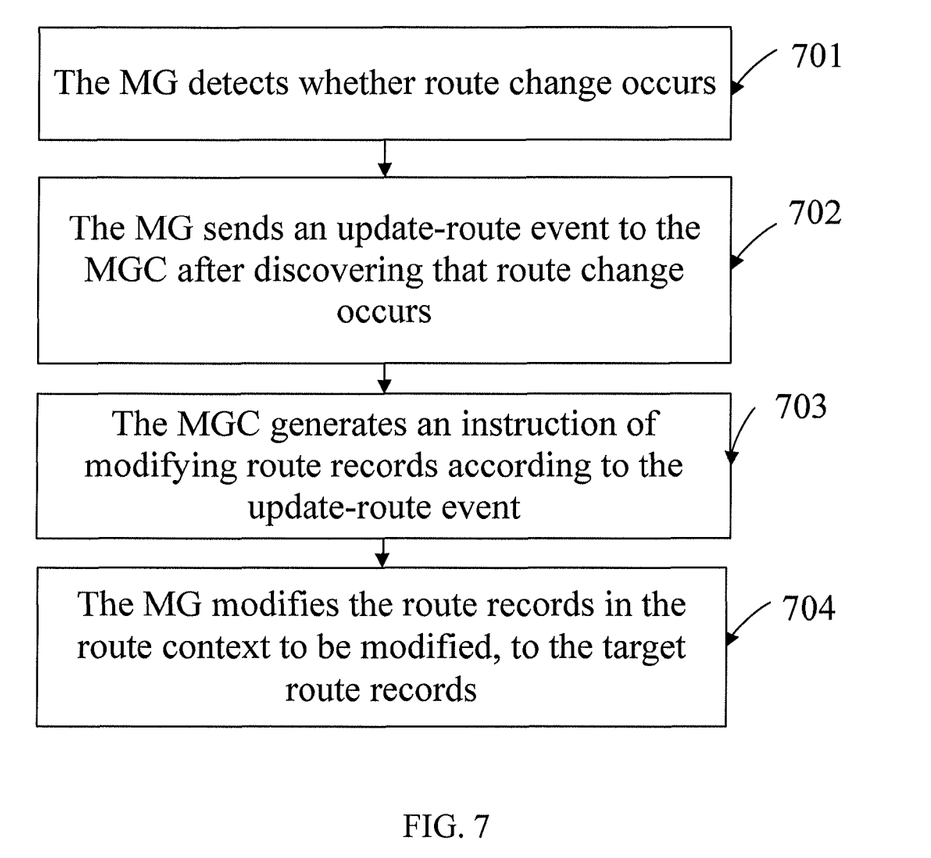
FIG. 7 is a flowchart of modifying a route in the route management method of an MG in Embodiment 2 of the present invention.

As shown in FIG. 7, in order to modify the route quickly, the steps of operating a route based on the MG route management method in this embodiment are as follows:

701. The MG detects whether route change occurs.

Detecting route change is to detect whether a route needs to be modified to another route. A possible scenario of route change is one of the following: The next-hop routing device fails, the network topology changes, route negotiation based on the DRP occurs between routing devices, and the next-hop address changes. In this case, part of the route records changes.

702. The MG sends an update-route event to the MGC after discovering that route change occurs.

When discovering the route change, the MG sends an update-route event to the MGC. The event carries a route context ID to be deleted, and the target route records to which the source route records need to be modified. If the context stores more than two route records, the event needs to carry the route records that need to be modified.

To enable the MG to send the update-route event to the MGC in this step, an Update Route Record (URR) event is added for reporting the modified route records. This event is detected on the termination of the interface context. A parameter "context ID" is defined for the URR event to carry the route context ID, a parameter "ofib" is defined for the URR event to carry the updated route records, and a parameter "nfib" is defined for the URR event to carry the target route records to which the source route records are updated. In practice, the URR event in this embodiment may be used to report modification of more than two route records. That is, the "ofib" parameter carries multiple updated route records, and the "nfib" parameter carries the corresponding target route records.

703. The MGC generates an instruction for modifying route records according to the update-route event.

After receiving the update-route event, the MGC generates an instruction for modifying route records, and sends the instruction to the MG.

704. The MG modifies the route records in the route context to be modified, to the target route records.

After receiving the instruction for modifying route records, the MG finds the route context according to the route context ID to be modified, and modifies the corresponding route records in the found route context to the target route records.

In the modification steps above, the MG needs to interact with the MGC only once, thus shortening the interaction time and modifying the route more quickly.

If a route context is defined to carry only one route record, neither the "entries" parameter of the DRR event nor the "ofib" parameter of the URR event is required.

If the NRR event and the DRR event are defined as being detected and reported on the termination in the route context, it is not necessary for the event parameter to carry the route context ID because the message body itself carries the context ID of the route context corresponding to the termination.

If the route is refreshed too quickly, for example, the MG obtains plenty of route records through DRP shortly after startup, if the event is reported too quickly, the network may be congested. Therefore, a parameter may be defined to set the speed of the MG reporting the messages of adding, deleting and modifying routes. For example, a threshold of the number of events reported per second is set.

Figure 8:
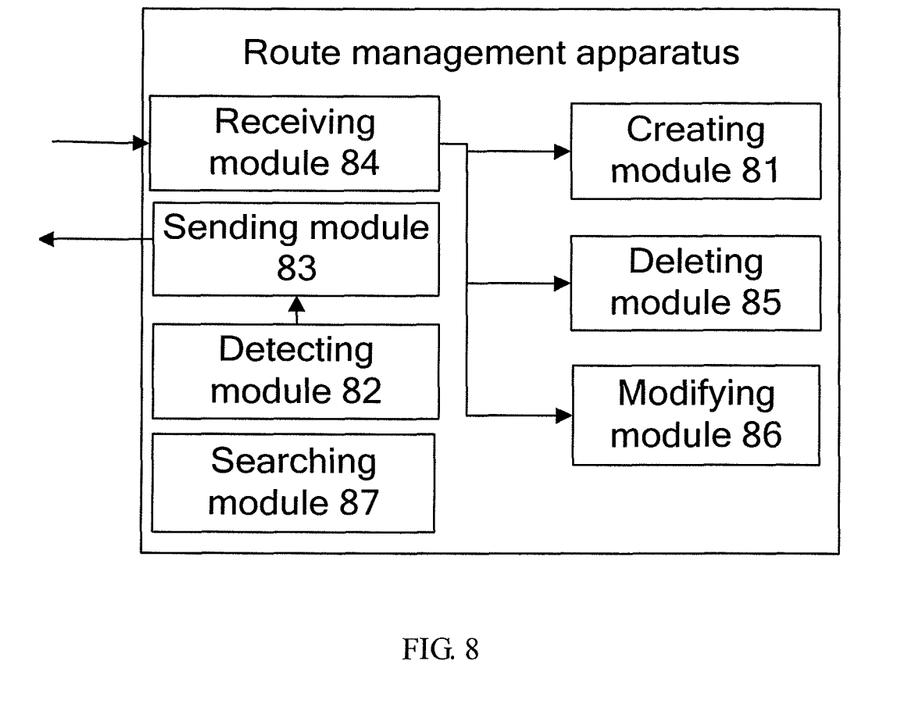
FIG. 8 is a block diagram of a route management apparatus of an MG in Embodiment 2 of the present invention.

Corresponding to the foregoing MG route management method, an MG route management apparatus is provided in this embodiment. As shown in FIG. 8, the apparatus includes a creating module 81 and a searching module 87. The creating module 81 creates a route context in the MG, namely, creates a context whose type property value is "RIPR", and then a Route Record property is added in the route context. The Route Record property stores a route record. Moreover, the creating module 81 is further configured to: create an interface context for each group of interfaces, where the interface context includes a topological relationship between interfaces in each group; and add a correlation property in the interface context and the route context. If the interfaces in the interface context are the same as the interfaces in the route context, their correlation property is set to the same value, for example, set to the context ID of the interface context.

In the case of searching for a route record, the searching module 87 searches all route contexts whose correlation property is the same as the correlation property of the corresponding interface context, namely, searches all route contexts whose correlation property is the corresponding interface context ID.

In order to operate the route context and the interface context, the MG route management apparatus in this embodiment includes: a detecting module 82, a sending module 83, a receiving module 84, a deleting module 85, and a modifying module 86.

The detecting module 82 is configured to detect the route change, primarily detect whether a route is added, deleted or modified.

After detecting that a route is added, deleted, or modified, the sending module 83 sends the corresponding operation event to the MGC. If detecting that a route is added, the sending module sends an NRR event that carries the new route record; if detecting that a route is deleted, the sending module sends a DRR event that carries the ID of the route context to be deleted, or carries the route records to be deleted and the corresponding route context ID; and if detecting that a route is modified, the sending module sends an URR event that carries the ID of the route context to be modified, and the modified target route record.

According to the operation request sent by the MG, the MGC generates the corresponding operation instruction and sends the instruction to the MG. The MG receives the operation instruction through the receiving module 84.

After receiving an instruction for adding a route record from the MGC, the MG may perform the following operations:

search for an existing route context through the creating module 81, and add the new route record into the Route Record property of the route context; or create a new route context through the creating module 81, and store the new route record into the Route Record property of the new route context.

If receiving an instruction for deleting route records from the MGC, the deleting module 85 of the MG deletes the route context corresponding to the route context ID; or finds the context corresponding to the context ID and deletes the route records that need to be deleted in the context.

If receiving an instruction for modifying route records, the modifying module 86 of the MG modifies the route records in the corresponding route context to the target route records.

In the embodiment described above, the MG reports an operation request to the MGC, and then the MGC sends the corresponding operation instruction. In practice, the MGC may send an operation instruction to the MG directly being without requested, for example, an instruction for adding, deleting or modifying a route record. After receiving instruction, the receiving module 84 of the MG performs the corresponding operation according to the instruction. The specific operation is performed by the creating module 81, deleting module 85, or modifying module 86. The detailed operations have been described above.

The MG and the MGC make up a route management system. The MGC controls the MG to create a route context and an interface context, and create a correlation in the interface context and the route context. Through the H.248 protocol, the MGC controls the MG to operate the routes, for example, add, delete or modify routes. Such operations are the same as the processes illustrated in FIG. 5, FIG. 6 and FIG. 7.

The embodiments of the present invention are applied to the MG and the MGC, especially in the case that the MGC manages the routes in the MG.

In the embodiments of the present invention, a route context stores the route records. Therefore, the route records can be operated by operating the route context, which facilitates the operation.

In the case of adding, deleting or modifying a route record, the MG may report an event; after receiving the event, the MGC controls the MG to perform operations, which is applicable when MGC controls the MG automatically. In the case of adding, deleting or modifying a route record, the MGC may control the MG to perform operations directly without receiving any event from the MG, which is applicable to manual control.

After reading the foregoing embodiments, those skilled in the art are clearly aware that the embodiments of the present invention may be implemented through hardware, or, preferably in most circumstances, through software in addition to a necessary universal hardware platform. Therefore, the technical solution under the present invention or its novelty in contrast to the prior art may be embodied in a software product. The software product is stored in a computer-readable storage medium such as computer floppy disk, hard disk and CD-ROM, and incorporates several instructions for instructing a computer device (for example, personal computer, server, or network device) to execute the method specified in each embodiment of the present invention.

The above descriptions are merely preferred embodiments of the present invention, but not intended to limit the scope of the present invention. Any modifications, variations or replacement that can be easily derived by those skilled in the art should fall within the scope of the present invention. Therefore, the protection scope of the present invention is subject to the appended claims.

What is claimed is:

1. A route management method, comprising:
    creating, by a Media Gateway (MG), a route context that stores at least one route record; and
    managing, by the MG, the route record by operating the route context, wherein the managing the route record by operating the route context comprises:
    detecting that a new route is added;
    sending an add-route event that carries a new route record to a Media Gateway Controller (MGC);
    receiving an instruction for adding the new route record from the MGC;
    creating the route context according to the instruction for adding the new route record, wherein the at least one route record stored in the route context is the route record carried in the add-route event.

2. The route management method according to claim 1, further comprising:
    creating an interface context for interfaces of the MG; and
    creating a correlation between the interface context and the route context.

3. The route management method according to claim 2, further comprising:
    searching for the route context according to the correlation between the interface context and the route context.

4. The route management method according to claim 2, wherein the creating the interface context for the interfaces of the MG comprises:
    grouping all interfaces of the MG into at least one group; and
    creating an interface context for each group of interfaces separately.

5. The route management method according to claim 1, wherein the managing the route record by operating the route context further comprises:
    detecting a route that needs to be deleted;
    sending a delete-route event to the MGC, wherein the delete-route event carries a route context identifier (ID) of the route to be deleted, or carries route records to be deleted and a route context ID corresponding to a route context that covers the route records to be deleted;
    receiving an instruction for deleting the route records from the MGC; and
    deleting a route context corresponding to the route context ID according to the instruction for deleting the route records, or deleting the route records that need to be deleted from the route context that corresponds to the route context ID and covers the route records to be deleted.

6. The route management method according to claim 1, wherein the managing the route record by operating the route context further comprises:

detecting a route that needs to be modified;

sending an update-route event to the MGC, wherein the update-route event carries a route context identifier (ID) to be modified, and target route records of the modification;

receiving an instruction for modifying route records from the MGC; and modifying the route records in the route context to be deleted to the target route records, according to the instruction for modifying the route records.

7. The route management method according to claim 1, wherein the managing the route record by operating the route context further comprises:

receiving at least one of the following: an instruction for adding a route record; an instruction for deleting route records; and an instruction for modifying route records; and changing the route records according to the received instruction.

8. A route management apparatus, comprising:

a creating module, configured to create a route context that stores at least one route record in a Media Gateway (MG);

a detecting module, configured to detect whether there is a new route;

a sending module, configured to send an add-route event that carries a new route record to a Media Gateway Controller (MGC) if a new route is detected; and a receiving module, configured to receive an instruction for adding the new route record from the MGC;

wherein the creating module is further configured to add the route record carried in the event into a created route context according to the instruction for adding the route record; or create a route context according to the instruction for adding the route record and store the route record carried in the event into the created route context.

9. The route management apparatus according to claim 8, wherein:

the creating module is further configured to create an interface context for interfaces of the MG; and create a correlation between the interface context and the route context.

10. The route management apparatus according to claim 9, further comprising:

a searching module, configured to search for the route context according to the correlation between the interface context and the route context.

11. The route management apparatus according to claim 8, wherein:

the detecting module, further configured to detect whether a route needs to be deleted;

the sending module, further configured to send a delete-route event to the MGC if the route to be deleted is detected, wherein the delete-route event carries a route context identifier (ID) of the route to be deleted, or carries route records to be deleted and a route context ID corresponding to a route context that covers the route records to be deleted;

the receiving module, further configured to receive an instruction for deleting route records from the MGC; and the route management apparatus further comprises:

a deleting module, configured to delete a route context corresponding to the route context ID according to the instruction for deleting the route records, or delete the route records that need to be deleted from the route context that corresponds to the route context ID and covers the route records to be deleted.

12. The route management apparatus according to claim 8, wherein:

the detecting module, further configured to detect whether a route needs to be modified;

the sending module, further configured to send an update-route event to the MGC if the route to be modified is detected, wherein the update-route event carries a route context identifier (ID) to be modified, and target route records of the modification;

the receiving module, further configured to receive an instruction for modifying route records from the MGC; and the route management apparatus further comprises:

a modifying module, configured to modify the route records in the route context to be deleted to the target route records, according to the instruction for modifying the route records.

13. A route management system, comprising a Media Gateway Controller (MGC) and a Media Gateway (MG), wherein:

the MG is configured to create a route context that stores at least one route record in the MG;

detect whether there is a new route; send an add-route event that carries a new route record to the MGC if a new route is detected; receive an instruction for adding the new route record from the MGC; and the MG is further configured to add the route record carried in the event into a created route context according to the instruction for adding the route record; or create a route context according to the instruction for adding the route record and store the route record carried in the event into the created route context.

* * * * *